United States Patent
Kim et al.

(10) Patent No.: US 9,762,303 B2
(45) Date of Patent: Sep. 12, 2017

(54) ELECTRONIC DEVICE AND METHOD FOR PERFORMING COMMUNICATION BY SELECTIVELY USING MULTIPLE ANTENNAS

(71) Applicant: Samsung Electronics Co., Ltd., Gyeonggi-do (KR)

(72) Inventors: Sung Soo Kim, Gyeonggi-do (KR); Min Chull Paik, Gyeonggi-do (KR); Young Sik Byun, Gyeonggi-do (KR); Jae Ryong Lee, Gyeonggi-do (KR); Sung Chul Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/042,853

(22) Filed: Feb. 12, 2016

(65) Prior Publication Data

US 2016/0241319 A1    Aug. 18, 2016

(30) Foreign Application Priority Data

Feb. 13, 2015    (KR) .................. 10-2015-0022738

(51) Int. Cl.
*H04B 7/06* (2006.01)
*H01Q 1/24* (2006.01)
(Continued)

(52) U.S. Cl.
CPC ........... *H04B 7/0608* (2013.01); *H01Q 1/241* (2013.01); *H01Q 1/242* (2013.01); *H01Q 21/28* (2013.01);
(Continued)

(58) Field of Classification Search
CPC .. H04B 7/0608; H04B 1/0064; H04B 17/318; H04B 7/0802; H04B 7/0632; H04B 17/309; H04B 7/0602
(Continued)

(56) References Cited

U.S. PATENT DOCUMENTS 6,999,789 B2    2/2006 Hattori
7,339,390 B2    3/2008 Cranford, Jr. et al.
(Continued)

FOREIGN PATENT DOCUMENTS

EP    1 796 358 A2    6/2007
EP    2 515 593 A2    10/2012
KR    10-2013-0112486 A    10/2013

OTHER PUBLICATIONS

International Search Report, dated May 19, 2016.
European Search Report, dated Jul. 13, 2016.
European Search Report dated Oct. 12, 2016.

*Primary Examiner* — Emmanuel Bayard
(74) *Attorney, Agent, or Firm* — Cha & Reiter, LLC.

(57) ABSTRACT

A method performed in an electronic device is provided. The method includes: collecting operation information on at least one of a data communication operation, a paging operation, and a voice communication operation of a first antenna, a second antenna, or a third antenna; determining at least one antenna to be used of the first antenna, the second antenna, and third antenna based on at least part of the collected operation information; and performing communication by using the determined antenna.

19 Claims, 10 Drawing Sheets

(51) Int. Cl.
  *H04B 7/08* (2006.01)
  *H04B 17/318* (2015.01)
  *H04B 1/40* (2015.01)
  *H01Q 21/28* (2006.01)
  *H04W 52/02* (2009.01)

(52) U.S. Cl.
  CPC ............... *H04B 1/40* (2013.01); *H04B 7/082* (2013.01); *H04B 7/0814* (2013.01); *H04B 7/0822* (2013.01); *H04B 7/0825* (2013.01); *H04B 7/0834* (2013.01); *H04B 17/318* (2015.01); *H04W 52/0245* (2013.01); *Y02B 60/50* (2013.01)

(58) Field of Classification Search
  USPC .................................. 375/267, 299, 347, 349
  See application file for complete search history.

(56) References Cited

U.S. PATENT DOCUMENTS

| | | | |
|---|---|---|---|
| 7,395,086 B2 | 7/2008 | Hattori | |
| 7,408,374 B2 | 8/2008 | Cranford, Jr. et al. | |
| 7,471,101 B2 | 12/2008 | Cranford, Jr. et al. | |
| 7,778,223 B2 | 8/2010 | Sakakibara | |
| 8,326,293 B2 | 12/2012 | Reinhold et al. | |
| 8,872,706 B2 | 10/2014 | Caballero et al. | |
| 8,947,302 B2 | 2/2015 | Caballero et al. | |
| 9,236,930 B2 | 1/2016 | Larsen et al. | |
| 9,319,853 B2 * | 4/2016 | Li | H04W 4/12 |
| 2003/0119454 A1 | 6/2003 | Hattori | |
| 2006/0003801 A1 | 1/2006 | Hattori | |
| 2006/0267616 A1 | 11/2006 | Cranford, Jr. et al. | |
| 2007/0087718 A1 | 4/2007 | Sakakibara | |
| 2007/0103173 A1 | 5/2007 | Cranford, Jr. et al. | |
| 2008/0068038 A1 | 3/2008 | Cranford, Jr. et al. | |
| 2008/0146175 A1 * | 6/2008 | Rakshani | H04B 1/0014 455/129 |
| 2008/0217614 A1 | 9/2008 | Cranford et al. | |
| 2009/0135081 A1 * | 5/2009 | Imura | H01Q 1/242 343/876 |
| 2010/0316155 A1 | 12/2010 | Reinhold | |
| 2011/0026626 A1 * | 2/2011 | Sahlin | H04L 5/0037 375/260 |
| 2012/0112969 A1 | 5/2012 | Caballero et al. | |
| 2012/0112970 A1 | 5/2012 | Caballero et al. | |
| 2012/0264473 A1 | 10/2012 | Mujtaba et al. | |
| 2012/0282982 A1 | 11/2012 | Mujtaba et al. | |
| 2013/0222515 A1 * | 8/2013 | Abuan | H04N 7/14 348/14.01 |
| 2014/0073371 A1 | 3/2014 | Mujtaba et al. | |
| 2014/0220916 A1 * | 8/2014 | Mujtaba | H04B 7/0817 455/140 |
| 2014/0329472 A1 * | 11/2014 | Kovacs | H04B 17/0085 455/67.14 |
| 2014/0349584 A1 * | 11/2014 | Clevorn | H04B 7/0689 455/67.13 |
| 2014/0370824 A1 | 12/2014 | Larsen et al. | |
| 2015/0002308 A1 * | 1/2015 | Walley | H04Q 9/00 340/870.01 |
| 2015/0003551 A1 | 1/2015 | Kim | |
| 2015/0005037 A1 | 1/2015 | Caballero et al. | |
| 2015/0006616 A1 * | 1/2015 | Walley | H04L 67/16 709/203 |
| 2015/0042881 A1 * | 2/2015 | Fincham | H04N 5/57 348/552 |
| 2015/0092708 A1 * | 4/2015 | Su | H04W 76/026 370/329 |
| 2015/0126182 A1 * | 5/2015 | Dong | H04W 88/06 455/426.1 |
| 2015/0145734 A1 | 5/2015 | Caballero et al. | |
| 2015/0296396 A1 | 10/2015 | Mujtaba et al. | |
| 2015/0309177 A1 * | 10/2015 | Wallace | G01S 19/41 342/357.25 |
| 2016/0197665 A1 * | 7/2016 | Moshfeghi | H04W 88/06 375/267 |
| 2016/0276748 A1 * | 9/2016 | Ramachandran | H01Q 21/28 |
| 2016/0301456 A1 * | 10/2016 | Clevorn | H04B 7/0689 |

* cited by examiner

ELECTRONIC DEVICE AND METHOD FOR PERFORMING COMMUNICATION BY SELECTIVELY USING MULTIPLE ANTENNAS

CLAIM OF PRIORITY

This application claims the benefit under 35 U.S.C. §119 (a) of a Korean patent application filed on Feb. 13, 2015 in the Korean Intellectual Property Office and assigned Serial number 10-2015-0022738, the entire disclosure of which is hereby incorporated by reference.

TECHNICAL FIELD

The present disclosure relates to an electronic device including a plurality of antennas, and more particularly to an electronic device for performing communication by selecting at least one antenna to be used from the plurality of antennas based on a communication operation of the electronic device and a method performed by the electronic device.

BACKGROUND

With recent development of information communication technology, it is possible to send/receive a large amount of data at high speed by using 3G network, LTE network, and WiFi network. Along with this, in relation to an electronic device used for transmitting/receiving conventional incoming and outgoing calls and SMS messages, data communication becomes possible freely anywhere in the country.

In relation to an electronic device according to various embodiments of the present disclosure, component and antenna spaces are limited and heat is generated therein as a Radio Frequency Integrated Circuit (RFIC) for processing data communication and another RFIC for processing incoming/outgoing calls are provided separately.

SUMMARY

Accordingly, an aspect of the present disclosure is to provide an electronic device and a method for performing communication by selectively using a plurality of antennas based on a communication operation of the electronic device.

In accordance with an aspect of the present disclosure, a method performed in an electronic device is provided. The method includes: collecting operation information on at least one of a data communication operation, a paging operation, and a voice communication operation of a first antenna, a second antenna, or a third antenna; determining at least one antenna to be used of the first antenna, the second antenna, and third antenna based on at least part of the collected operation information; and performing communication by using the determined antenna.

In accordance with an aspect of the present disclosure, an electronic device includes: a communication circuit configured to perform communication with an external electronic device based on a first communication protocol or a second communication protocol; a first antenna, a second antenna, and a third antenna connected to the communication circuit; a processor electrically connected to the communication circuit; and a memory electrically connected to the processor, wherein the processor collects operation information and electric field state information on at least one of a data communication operation, a paging operation, and a voice communication operation of the communication circuit and allows the communication circuit to perform communication by using at least one of the first antenna, the second antenna, and the third antenna based on at least part of the collected operation information and electric field state information.

In accordance with an aspect of the present disclosure, provided is a non-transitory computer readable recording medium configured to store instructions executed by at least one processor and readable by a computer. The instructions are set to collect operation information on at least one of a data communication operation, a paging operation, and a voice communication operation of a first antenna, a second antenna, or a third antenna; and allow an electronic device to perform communication by using at least one of the first antenna, the second antenna, and the third antenna based on at least part of the collected operation information.

In accordance with another aspect of the invention, there is presented a method performed in an electronic device comprising a first antenna, a second antenna, and a third antenna. The method comprises measuring the communication performance of the first antenna while operating the second antenna; measuring the communication performance of the first antenna while operating the third antenna; selecting one of the second antenna and the third antenna based at least in part on the measured communication performance of the first antenna while operating the second antenna and the measured communication performance of the first antenna while operating the third antenna.

DETAILED DESCRIPTION

Figure 1:
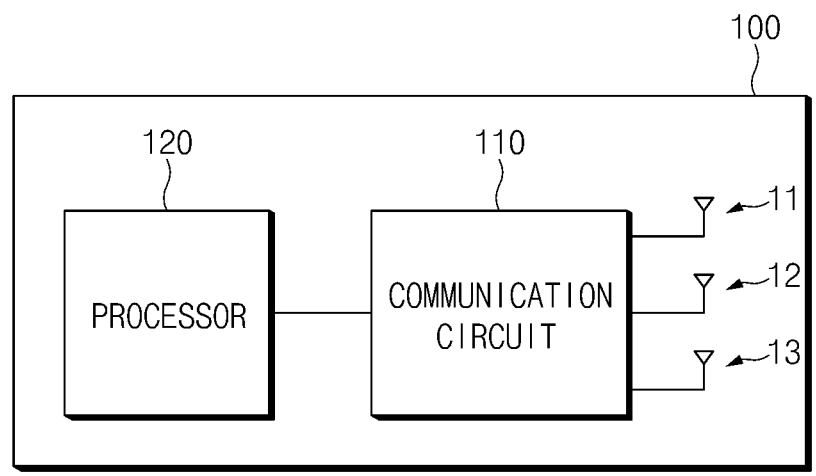
FIG. 1 is a block diagram illustrating an electronic device including a plurality of antenna according to various embodiments of the present disclosure.

Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing a plurality of instructions stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any case, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

Additionally, it will be described with reference to the accompanying drawings that a smartphone is an example of an electronic device according to various embodiments of the present disclosure.

FIG. 1 is a block diagram illustrating an electronic device 100 including a plurality of antennas 11 to 13 according to various embodiments of the present disclosure. Referring to FIG. 1, the electronic device 100 may include a communication circuit 110 for connecting a first antenna 11, a second antenna 12, and a third antenna 13, and a processor 120. The communication circuit 110, for example, may be a Radio Frequency Integrated Circuit (RFIC). Although not shown in FIG. 1, the electronic device 100 may further include a memory for storing instructions relating to operations performed in the communication circuit 110 or the processor 120.

The communication circuit 110, for example, may perform communication with an external electronic device based on a first communication protocol or a second communication protocol. The first communication protocol or the second communication protocol, for example, may include wireless fidelity (WiFi) communication, Bluetooth (BT) communication, Bluetooth low energy (BLE) communication, near field communication (NFC) communication, global positioning system (GPS) communication, or cellular communication (for example, 3G, LTE, LTE-A, CDMA, WCDMA, UMTS, WiBro or GSM). According to various embodiments of the present disclosure, the first communication protocol is LTE communication protocol and the second communication protocol is 2G communication protocol, 2.5G communication protocol, or 3G communication protocol. Hereinafter, by way of example and not limitation, the first communication protocol can be LTE communication protocol and the second communication protocol can be 3G communication protocol.

According to various embodiments of the present disclosure, a communication operation performed by the communication circuit 110 may include a data communication operation, a paging operation, or a voice communication operation. The paging operation is a prerequisite operation for the voice communication and when receiving a paging signal through the paging operation, the communication circuit 110 may perform voice communication.

The communication circuit 110 may perform communication by using at least one of the first antenna 11, the second antenna 12, and the third antenna 13.

According to various embodiments of the present disclosure, the first antenna 11 and the second antenna 12 may be used based on the same communication protocol. For example, both the first antenna 11 and the second antenna 12 may be being used based on the LTE communication protocol or may be being used based on the 3G communication protocol. However, as mentioned above, according to all embodiments of the present disclosure, the first antenna 11 and the second antenna 12 are used based on the same communication protocol and the scope of the present disclosure is not limited thereto.

Additionally, according to various embodiments of the present disclosure, the third antenna 13 may be used based on one communication protocol (for example, the LTE communication protocol or the 3G communication protocol).

Accordingly, the first antenna 11, the second antenna 12, and the third antenna 13, for example, may be all used based on the LTE communication protocol. Additionally, the first antenna 11 and the second antenna 12 may be used based on the LTE communication protocol and the third antenna 13 may be used based on the 3G communication protocol.

Referring to FIG. 1, it is shown as if the first antenna 11, the second antenna 12, and the third antenna 13 were connected to the communication circuit 110. However, according to various embodiments of the present disclosure, at least some of the first antenna 11, the second antenna 12, and the third antenna 13 may be implemented to be selectively connected to the communication circuit 110. For example, each of the first antenna 11, the second antenna 12, and the third antenna may be connected to the communication circuit 110 through a switch that selectively connects (shorts) a signal line from the communication circuit 110 or disconnect (opens) the signal line.

According to various embodiments of the present disclosure, the processor 120 may execute calculation or data processing for control and/or communication of at least one another component (for example, the communication circuit 110 and a memory (not shown)) of the electronic device 100.

The processor 120, for example, may implemented with a system on chip (SoC) and may include one or more of a central processing unit (CPU), a graphic processing unit (GPU), an image signal processor, an application processor (AP), or a communication processor (CP).

The processor 120 may load instructions or data received from at least one of other components, from a memory (not shown) and process them and may store various data in the memory.

According to various embodiments of the present disclosure, the processor 120 may collection operation information on at least one of the data communication operation, paging operation, or voice communication operation of the communication circuit 110. Additionally, the processor 120 may further collect electric field state information (for example, storing electric field or weak electric field) in correspondence to a radio reception state of the communication circuit 110.

The processor 120 may determine to allow the communication circuit 110 to perform communication by using at least one of the first antenna 11, the second antenna 12, and the third antenna 13 based on at least some of the collected operation information and electric field state information. Various embodiments for determining to allow the processor 120 to perform communication by using at least one antenna will be described later together with the description of the drawings.

According to various embodiments of the present disclosure, the memory may store data. At this point, data stored in the memory includes data inputted and outputted between each of components inside the electronic device 100 and data inputted and outputted between each of components outside the electronic device 100. For example, the memory may store operation information and electric field state information collected by the processor 120. Additionally, the memory may store instructions for allowing the processor 120 to perform communication by using at least one of the first antenna 11, the second antenna 12, and the third antenna 13 based on the collected operation information and electric field state information.

The memory may include an internal memory or an external memory. The internal memory, for example, may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)) or a hard disc drive.

The external memory, for example, may further include flash drive, for example, compact flash (CF), secure digital (SD), micro Micro-SD, Mini-SD, extreme digital (xD), (MultiMediaCard (MMC), or a memorystick. The external memory 100 may be functionally and/or physically connected to the electronic device 100 through various interfaces.

It is apparent to those skilled in the art that the communication circuit 110, the processor 120, and the memory may be implemented separately or at least one thereof may be implemented integrally.

Figure 2:
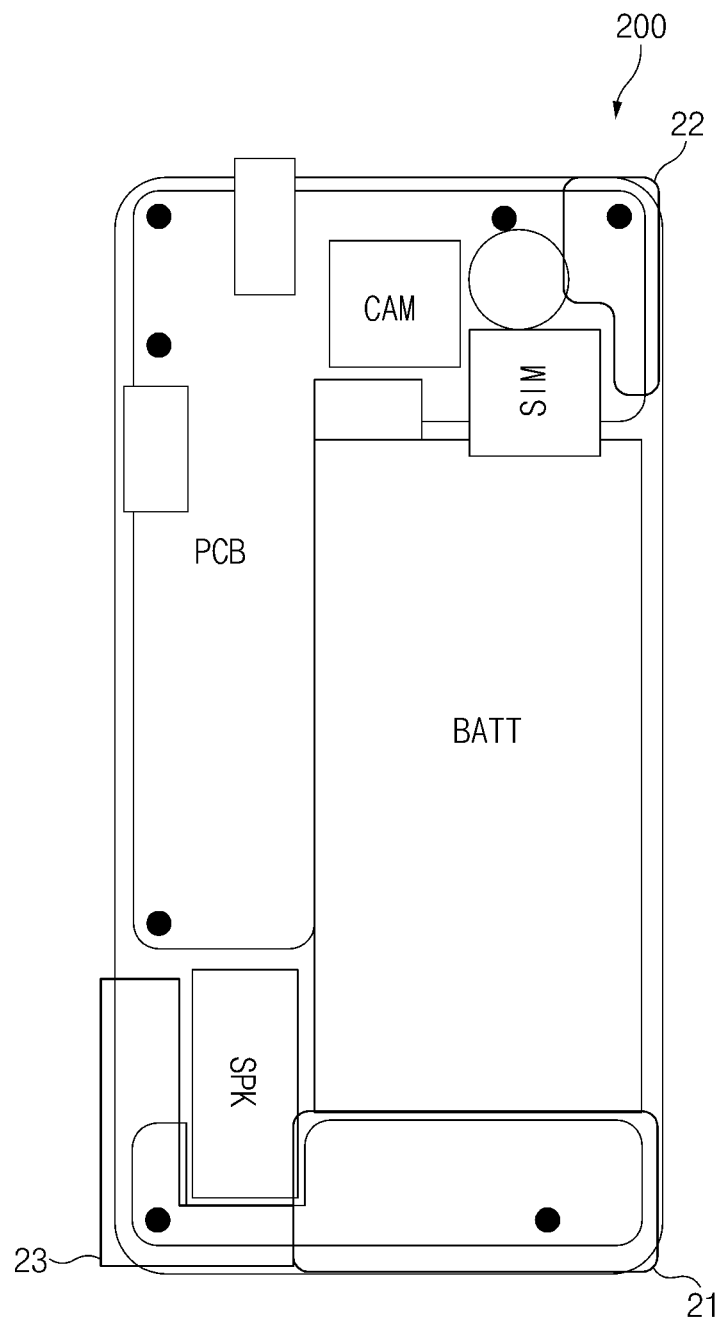
FIG. 2 is a view illustrating positions of a plurality of antennas in an electronic device according to various embodiments of the present disclosure.

FIG. 2 is a view illustrating positions of a plurality of antennas 21, 22, and 23 in an electronic device 200 according to various embodiments of the present disclosure. The back (that is, the back of a rear case) of the electronic device 200 where a battery case is removed is shown in FIG. 2. Referring to FIG. 2, the electronic device 200 may include an internal circuit board PCB, a battery BATT, a camera CAM, a Subscriber Identification Module (SIM) card slot, and a speaker SPK. Additionally, the electronic device 200 may include a first antenna 21, a second antenna 22, and a third antenna 23.

According to various embodiments of the present disclosure, in relation to the first antenna 21 as a main antenna, the communication circuit 110 may perform data communication through the first antenna 21 based on LTE communication protocol and perform voice communication through the first antenna 21 based on 3G communication protocol.

Additionally, according to various embodiments of the present disclosure, the second antenna 22 and the third antenna 23, as a sub antenna, may perform a paging operation through the second antenna 22 or the third antenna 23 based on communication protocol. However, various embodiments of the present disclosure are not limited to a case that the communication circuit 110 alternatively uses the second antenna 22 or the third antenna 23 at all times. Additionally, various embodiments of the present disclosure are not limited to a case that an operation that the communication circuit 110 uses the second antenna 22 or the third antenna 23 is a paging operation based on 3G communication protocol.

Referring to FIG. 2, the first antenna 21 may be disposed at a lower end of the electronic device 200 and the second antenna 22 may be disposed at an upper end of the electronic device 200. Accordingly, a distance between the first antenna 21 and the second antenna 22 may affect each other less (for example, interference) during an operation of each other. That is, the first antenna 21 and the second antenna 22 may be mounted with a distance for obtaining isolation therebetween. In general, the second antenna 22 is characterized by interference due to the number of proximate components. The third antenna 23 is characterized by interference due to its proximity to the first antenna 21.

However, the first antenna 21 is mounted at a position where there are relatively few components around but the second antenna 22 is mounted at a position where there are relatively many components around. Accordingly, the performance of the second antenna 22 may be less than that of the first antenna 21. For example, when the communication circuit 110 performs LTE data communication using the first antenna 21 and a 3G paging operation using the second antenna 22 at the same time, there may be performance deterioration of the second antenna 22.

Accordingly, the electronic device 200 may mount the third antenna 23 at another position where there is relatively are relatively few components. Referring to FIG. 2, similar to the first antenna 21, the third antenna 23 may disposed at a lower end of the electronic device 200. Accordingly, the communication circuit 110 may perform LTE data communication using the first antenna 21 and a 3G paging operation using the third antenna 23 instead of the second antenna 22 at the same time.

However, in the case of using the second antenna 22, performance deterioration may occur due to surrounding components and in the case of using the third antenna 23, interference may occur due to an operation of the first antenna 21. Accordingly, the processor 120 may select which one of the second antenna 22 and the third antenna 23 is to be used based on at least part of operation information of the communication circuit 110 and electric field state information around the electronic device 200.

According to various embodiments of the present disclosure, in the case of not performing LTE data communication, since the communication circuit performs a 3G paging operation by using the first antenna 21, the processor 120 may ground the third antenna 23 not to be used. When the communication circuit 110 performs an LTE paging operation by using the first antenna 21, the operation for grounding the third antenna 23 may be performed similarly.

Figure 3B:
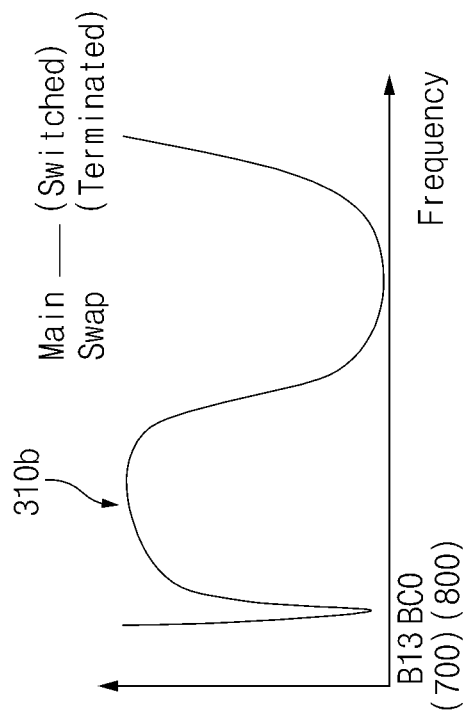
FIG. 3A and FIG. 3B are graphs illustrating switching of a first antenna and a ground operation of a third antenna according to various embodiments of the present disclosure.
Figure 3A:
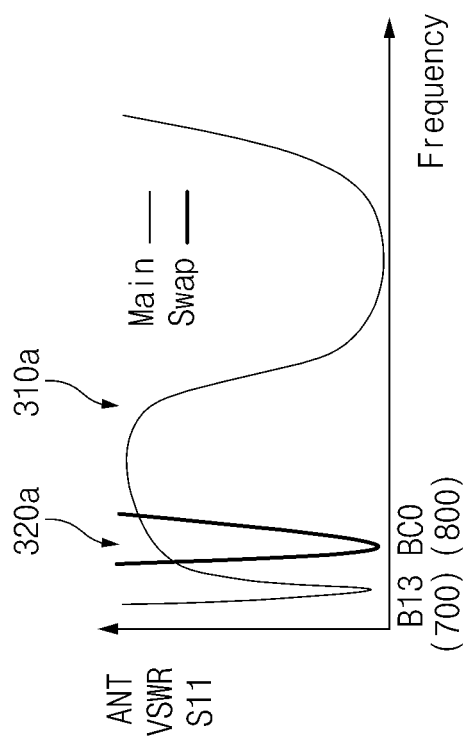

FIG. 3A and FIG. 3B are graphs illustrating switching of the first antenna 21 and a ground operation of the third antenna 23 according to various embodiments of the present disclosure.

Referring to the first antenna 21 and the third antenna 23 shown in FIG. 2, since the third antenna 23 is disposed adjacent to the first antenna 21 at a lower end of the electronic device 200, isolation between the first antenna 21 and the third antenna 23 may be difficult to obtain and interference may occur. Accordingly, the processor 120 may allow the communication circuit 110 to control operations of the first antenna 21 and the third antenna 23. The control operation will be described with FIG. 3A and FIG. 3B.

Referring to a graph 310a of FIG. 3A, the communication circuit 110 may perform an LTE data communication operation 310a corresponding to 700 MHz by using the first antenna 21. Additionally, referring to a graph 320a of FIG. 3A, the communication circuit 110 may perform a 3G paging operation 320a corresponding to 800 MHz by using the third antenna 23. In this case, the communication circuit 1210 may not use the second antenna 22. Additionally, referring to the graph 310a again, the communication circuit 110 may further perform an LTE data communication of a high frequency band by using the first antenna 21.

When receiving a paging signal by using the third antenna 23, the communication circuit 110 may stop the LTE data communication in execution by using the first antenna 21 and start 3G voice communication. 3G voice communication that is performed by the communication circuit 110 through the first antenna 21 is shown in FIG. 3B.

Referring to a graph 310b of FIG. 3B, the communication circuit 110 may perform 3G voice communication corresponding to 800 MHz by using the first antenna 21. At this point, the processor 120 may terminate or ground the third antenna 23 in order to reduce interference between the first antenna 21 and the third antenna 23. When the third antenna is connected to the communication circuit 110 through a switch, the processor 120 may ground the third antenna 23 by controlling the switch. Unlike this, according to other various embodiments of the present disclosure, the processor 120 may control the communication circuit 110 in terms of software in order for the communication circuit 110 not to operate the third antenna 23.

According to various embodiments of the present disclosure, the communication circuit 110 may allow the antenna resonance of the first antenna to move from 700 MHz to 800 MHz through an antenna matching change. Additionally, the antenna matching change operation may be performed by the processor 120.

Figure 4:
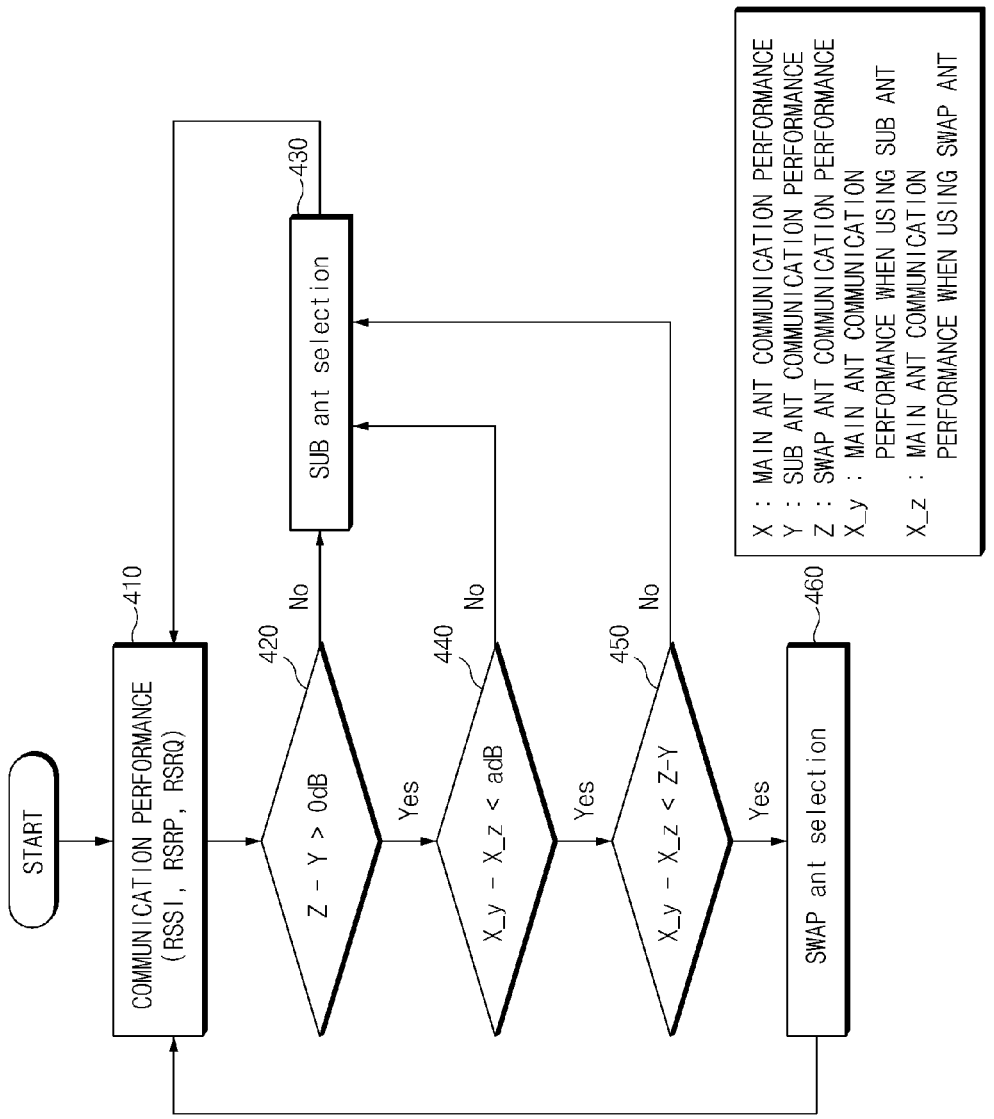
FIG. 4 is a flowchart illustrating a method of an electronic device to select one of a second antenna and a third antenna according to various embodiments of the present disclosure.

FIG. 4 is a flowchart illustrating a method of the electronic device 200 to select one of the second antenna 22 and the third antenna 23 according to various embodiments of the present disclosure. In FIG. 4, the second antenna 22 is referred to as sub ant and the third antenna 23 is referred to as swap ant.

As described with reference FIG. 3B, when the communication circuit 110 performs 3G voice communication by using the first antenna 21, due to interference, it may ground the third antenna 23 and use the second antenna 22.

However, according to various embodiments of the present disclosure, while the communication circuit 110 performs 3G voice communication by using the first antenna 21, when a user's head or hand approaches, a performance difference between the first antenna 21 and the second antenna 22 may occur and due to this, the second antenna 22 may not perform a diversity antenna function. In this case, when the performance in the case of performing 3G voice communication by using both the first antenna 21 and the third antenna 23 is better than that in the case of performing 3G voice communication by only using the first antenna 21, the communication circuit 110 may perform 3G voice communication by using both the third antenna 23 and the first antenna 21.

In this way, whether to select the second antenna 22 or the third antenna 23 may be determined differently according to each different situation. Hereinafter, an operation for selecting one antenna through operations 410 to 460 according to various embodiments of the present disclosure will be described.

In operation 410, the electronic device 200 may measure the communication performances (for example, received signal strength intensity/indication (RSSI), Reference Signal Received Power (RSRP) or reference signal received quality (RSRQ)) respectively corresponding to the first antenna 21, the second antenna 22, and the third antenna 23. Hereinafter, the communication performance is described based on RSSI, although RSRP, RSRQ, and other factors may be used. In this case, the communication performance of the first antenna 21 is referred to as "X", the communication performance of the second antenna 22 is referred to as "Y", and the communication performance of the third antenna 23 is referred to as "Z" in FIG. 4.

In operation 420, the electronic device 200 may compare the communication performance of the second antenna 22 and the communication performance of the third antenna 23. In this case, when the communication performance of the third antenna 23 is poorer than the communication performance of the second antenna 22, operation 420 proceeds to operation 430, so that the electronic device 200 may select the second antenna 22. During comparison, the measured antenna, for example, the second antenna 22 may be connected to the communication circuit 110, while the other antenna, the third antenna 23 is grounded.

However, when the communication performance of the third antenna 23 is better than the communication performance of the second antenna 22, operation 420 proceeds to operation 440.

In operation 440, the electronic device 200 may compare a difference between the communication performance of the first antenna 21 when using the second antenna 22 and the communication performance of the first antenna 21 when using the third antenna 23 with a predetermined value adB. In this case, when the difference between the communication performance of the first antenna 21 when using the second antenna 22 and the communication performance of the first antenna 21 when using the third antenna 23 is not less than the predetermined value adB, operation 440 proceeds to operation 430, so that the electronic device 200 may select the second antenna 22.

However, when the difference between the communication performance of the first antenna 21 when using the second antenna 22 and the communication performance of the first antenna 21 when using the third antenna 23 is less than the predetermined value adB, operation 440 proceeds to operation 450. The measurement of the signal performance of the first antenna 21 when using the third antenna 23 can be measured while connecting the first antenna 21 and the third antenna 23 to the communication circuit 110.

The method also takes interference between the first antenna 21 and each of the second antenna 22 and third antenna 23 into account. In operation 450, the electronic device 200 may compare a difference between the communication performance of the first antenna 21 when using the second antenna 22 and the communication performance of the first antenna 21 when using the third antenna 23 with a difference between the communication performance of the third antenna 23 and the communication performance of the second antenna 22. To measure the signal quality of the first antenna 21 when using the third antenna 23, the first antenna 21 and the third antenna 23 are both connected to the communication circuit 110 while the second antenna 22 is grounded. To measure the signal quality of the first antenna 21 when using the second antenna 23, the first antenna 21 and the second antenna 22 are both connected to the communication circuit 110 while the third antenna 23 is grounded. In this case, when the difference between the communication performance of the first antenna 21 when using the second antenna 22 and the communication performance of the first antenna 21 when using the third antenna 23 is not less than the difference between the communication performance of the third antenna 23 and the communication performance of the second antenna 22, operation 450 proceeds to operation 430, so that the electronic device 200 may select the second antenna 22.

However, when the difference between the communication performance of the first antenna 21 when using the second antenna 22 and the communication performance of the first antenna 21 when using the third antenna 23 is less than the difference between the communication performance of the third antenna 23 and the communication performance of the second antenna 22, operation 450 proceeds to operation 460, so that the electronic device 200 may select the third antenna 23.

Figure 5:
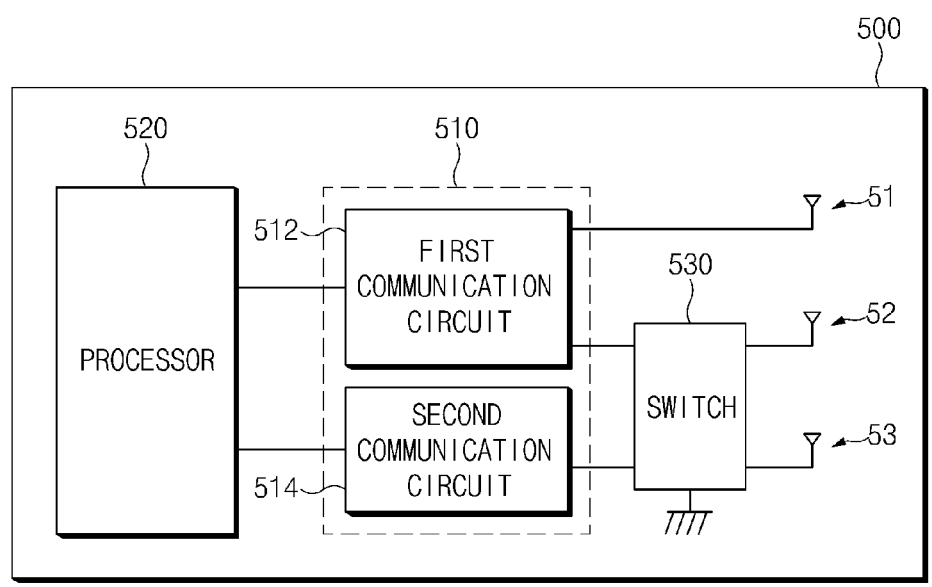
FIG. 5 is a block diagram illustrating an electronic device including a plurality of antenna according to other various embodiments of the present disclosure.

FIG. 5 is a block diagram illustrating an electronic device 500 including a plurality of antennas 51 to 53 according to other various embodiments of the present disclosure. The electronic device 500 may include a communication circuit 510 for connecting a first antenna 51, a second antenna 52, and a third antenna 53, and a processor 520. Hereinafter, repetitive descriptions for common operations among operations of components included in the electronic device 100 of FIG. 1 and the electronic device 500 of FIG. 5 are omitted.

Referring to FIG. 5, the communication circuit 510 may include a first communication circuit 512 and a second communication circuit 514. Referring to FIG. 5, the first antenna 51 may be fixedly connected to the first communication circuit 512. The second antenna 52 and the third antenna 53 may be connected to the first communication circuit 512 and the second communication circuit 514, respectively, through the switch 530. That is, the first communication circuit 512 may perform communication through the first antenna 51 or the second antenna 52. Additionally, the second communication circuit 514 may perform communication through the third antenna 53.

Through a control signal of the processor 520, the switch 530 may allow the second antenna 52 to be connected to the first communication circuit 512, the third antenna 53 to be connected to the second communication circuit 514, or ground one not in use of the second antenna 52 and the third antenna 53.

According to various embodiments of the present disclosure, the first communication circuit 512 may perform data communication or voice communication through at least one of the first antenna 51 and the second antenna 52. However, when a 3G paging operation is performed by using the first antenna 51 or the second antenna 52 while LTE data communication is performed by using the first antenna 51 and the second antenna 52 through one RFIC (for example, the first communication circuit 512), the speed of the LTE data communication may become slow. If an antenna performing a 3G paging operation is an antenna serving as primary Rx (PRx) (for example, the first antenna 51), the LTE data communication is disconnected, so that significant slowdown may occur. If an antenna performing a 3G paging operation is an antenna serving as diversity Rx (DRx) (for example, the second antenna 52), the LTE data communication is not disconnected but some slowdown may occur. Thus, various embodiments of the present disclosure, as an additional RFIC and antenna for performing a 3G paging operation, may include the second communication circuit 514 and the third antenna 53.

The second communication circuit 514 may perform a paging operation by using the third antenna 53. In this case, since the second communication circuit 514 serves to receive a paging signal through the paging operation, it may be implemented small in comparison to the first communication circuit 512. Accordingly, the second communication circuit 514 does not slow down data communication speed and occupies a circuit component space in a miniaturized electronic device.

According to various embodiments of the present disclosure, the communication circuit 510 may perform 3rd order diversity by using the first antenna 51, the second antenna 52, and the third antenna 53. For example, when performing 3G voice communication or a 3G paging operation, the communication circuit 510 may improve communication performance in a weak electric field by performing 3rd order diversity.

However, since it is a burden to simultaneously operate three antennas at the same time in terms of current consumption, the communication circuit 510 may perform 2nd order diversity or a single reception mode by varying the number of antennas to operate according to a situation. Whether to perform 2nd order diversity by using the second antenna 52 or the third antenna 53 may be determined based on each communication performance of RSSI or RSRQ.

According to various embodiments of the present disclosure, each of the first communication module 512 and the second communication module 514 may be connected to an additional port of a modem (not shown) and may be selectively connected to one port.

Figure 6:
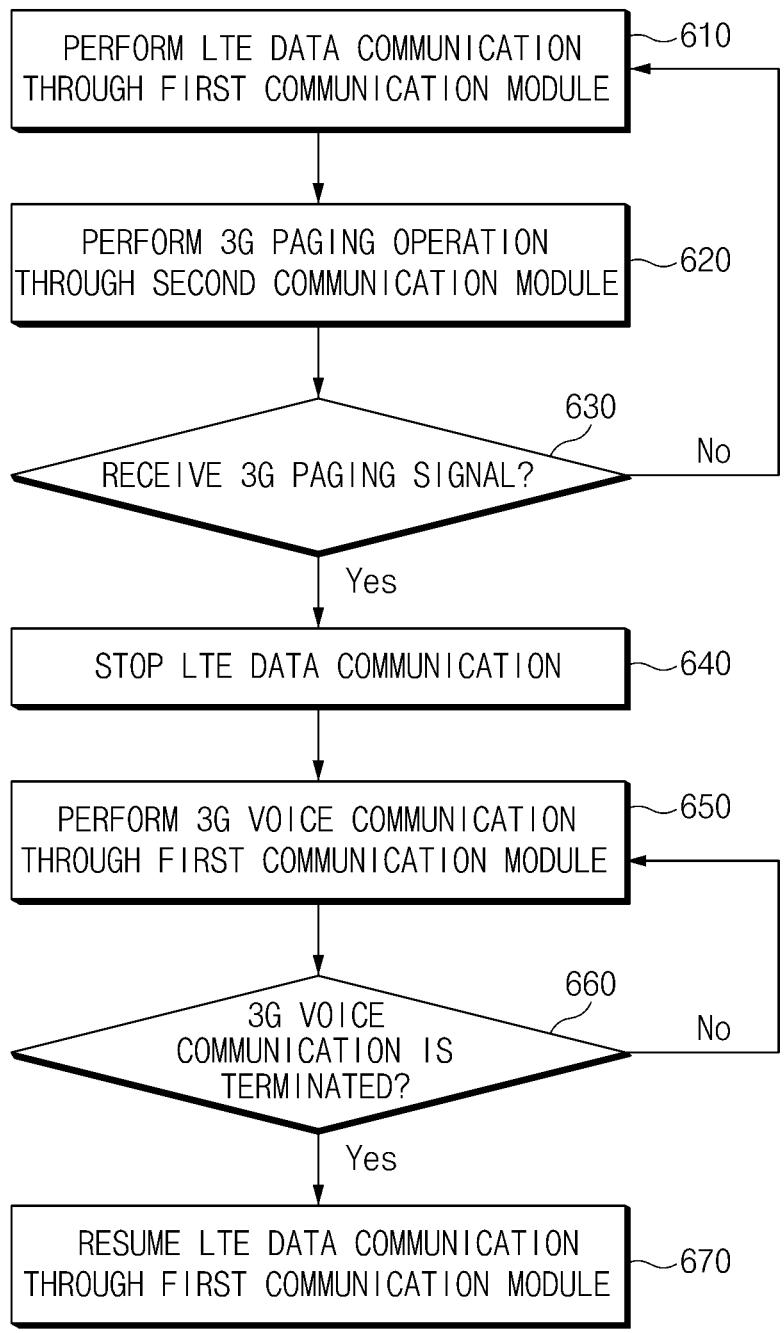
FIG. 6 is a flowchart illustrating a communication operation performed in a first communication circuit during an operation that a second communication circuit receives a paging signal while an electronic device performs data communication by using the first communication circuit according to various embodiments of the present disclosure.

FIG. 6 is a flowchart illustrating a communication operation performed in the first communication circuit 512 during an operation that the second communication circuit 514 receives a paging signal while the electronic device 500 performs data communication by using the first communication circuit 512 according to various embodiments of the present disclosure.

In operation 610, the first electronic device 500 may perform LTE data communication through the first communication circuit 512.

In operation 620, the electronic device 500 may perform a 3G paging operation through the second communication circuit 514.

When the electronic device 500 receives a paging signal in operation 630 through the 3G paging operation performed in operation 620, operation 630 may proceed to operation 640.

However, if not receiving the paging signal, the electronic device 500 may maintain operation 610 and perform operation 620 continuously.

In operation 640, the electronic device 500 may stop the LTE data communication performed in operation 610 by the first communication circuit 510.

In operation 650, the electronic device 500 may perform 3G voice communication through the first communication circuit 512.

In operation 660, the electronic device 500 may determine whether the 3G voice communication performed in operation 650 is terminated. Based on the determination result, when the 3G voice communication is terminated, operation 660 may proceed to operation 670.

On the other hand, when the 3G voice communication is not terminated, the electronic device 500 may maintain operation 650.

In operation 670, the electronic device 500 may resume the LTE data communication stopped in operation 640, through the first communication circuit 512. Additionally, in this case, the electronic device 500 may perform the 3G paging operation again through the second communication circuit 514.

Figure 7:
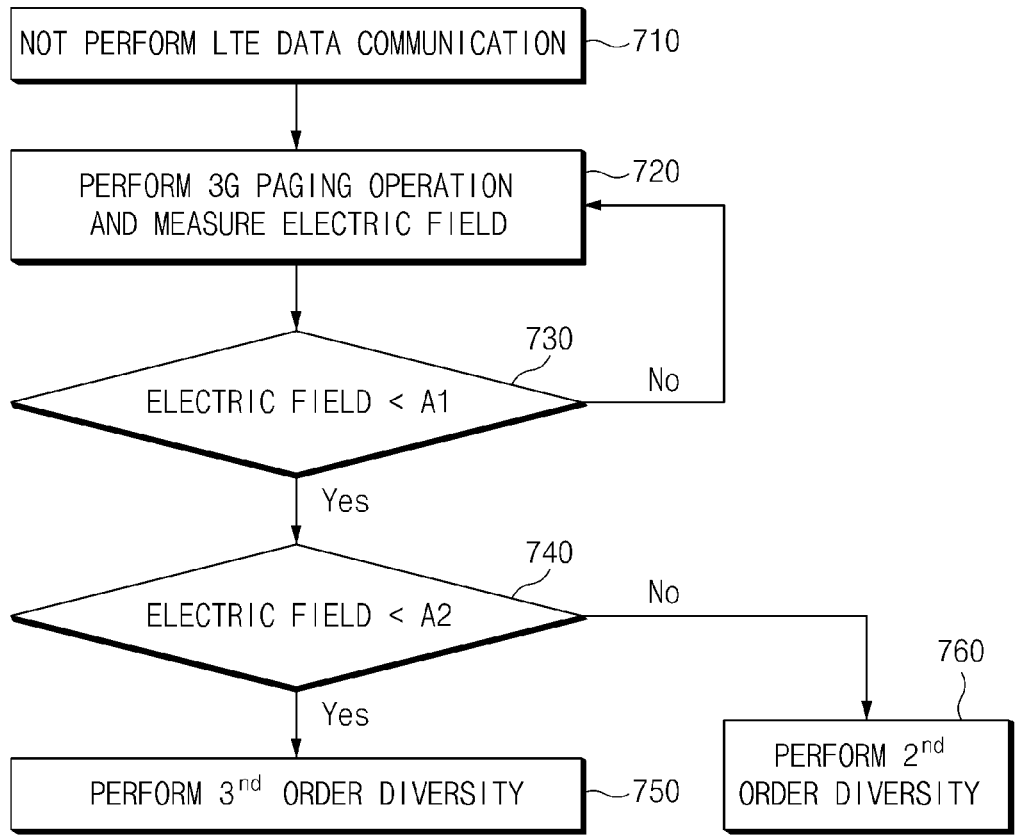
FIG. 7 is a flowchart illustrating a method of determining whether to perform a 3rd diversity operation, whether to perform a 2nd diversity operation, or whether to perform a diversity operation based on an electric field state while an electronic device does not perform data communication according to various embodiments of the present disclosure.

FIG. 7 is a flowchart illustrating a method of determining whether to perform a 3rd diversity operation, whether to perform a 2nd diversity operation, or whether to perform a diversity operation based on an electric field state while the electronic device 500 does not perform data communication according to various embodiments of the present disclosure.

In operation 710, the electronic device 500 may not be performing LTE data communication. In this case, the electronic device 500 may be performing a paging operation.

In operation 720, the electronic device 500 may perform a 3G paging operation in a single reception mode and at this point, measure an electric field state corresponding to the 3G paging operation.

In operation 730, the electronic device 500 may determine whether the measured electric field state in operation 720 is less than a predetermined value A1 dB. According to various embodiments of the present disclosure, A1 dB may be about −100 dBm. If the measured electric field state is less than the predetermined value A1 dB, operation 730 may proceed to operation 740.

However, if the measured electric field state is greater than the predetermined value A1 dB, the electronic device 500 may maintain the single reception mode as it is.

In operation 740, the electronic device 500 may determine whether the measured electric field state in operation 720 is less than a predetermined value A2 dB. According to various embodiments of the present disclosure, A2 dB may be about −105 dBm. The electronic device 500 performs 2nd or 3rd order diversity based on whether the measured electric field state exceeds the predetermined value, A2 dB. If the measured electric field state is less than the predetermined value A2 dB, operation 740 may proceed to operation 750.

However, if the measured electric field state is greater than the predetermined value A2 dB, operation 740 may proceed to operation 760.

In operation 750, the electronic device 500 may perform a 3G paging operation through 3rd order diversity.

In operation 760, the electronic device 500 may perform a 3G paging operation through 2nd order diversity.

Figure 8:
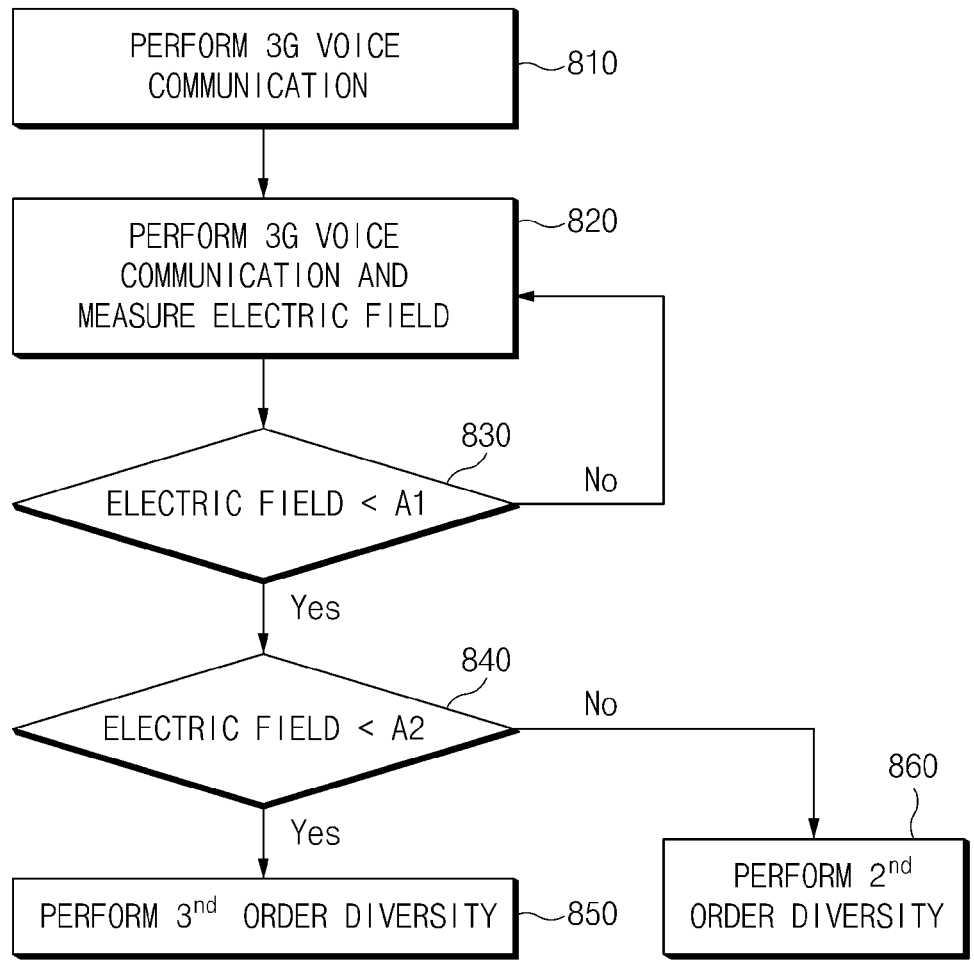
FIG. 8 is a flowchart illustrating a method of determining whether to perform a 3rd diversity operation, whether to perform a 2nd diversity operation, or whether to perform a diversity operation based on an electric field state while an electronic device performs voice communication according to various embodiments of the present disclosure.

FIG. 8 is a flowchart illustrating a method of determining whether to perform a 3rd diversity operation, whether to perform a 2nd diversity operation, or whether to perform a diversity operation based on an electric field state while the electronic device 500 performs voice communication according to various embodiments of the present disclosure.

In operation 810, the electronic device 500 may be performing 3G voice communication.

In operation 820, the electronic device 500 may perform 3G voice communication in a single reception mode and at this point, measure an electric field state corresponding to the 3G voice communication.

In operation 830, the electronic device 500 may determine whether the measured electric field state in operation 820 is less than a predetermined value A1 dB. According to various embodiments of the present disclosure, A1 dB may be about −100 dBm. If the measured electric field state is less than the predetermined value A1 dB, operation 830 may proceed to operation 840.

However, if the measured electric field state is greater than the predetermined value A1 dB, the electronic device 500 may maintain the single reception mode as it is.

In operation 840, the electronic device 500 may determine whether the measured electric field state in operation 820 is less than a predetermined value A2 dB. According to various embodiments of the present disclosure, A2 dB may be about −105 dBm. If the measured electric field state is less than the predetermined value A2 dB, operation 840 may proceed to operation 850.

However, if the measured electric field state is greater than the predetermined value A2 dB, operation 840 may proceed to operation 860.

In operation 850, the electronic device 500 may perform 3G voice communication through 3rd order diversity.

In operation 860, the electronic device 500 may perform 3G voice communication through 2nd order diversity.

Figure 9:
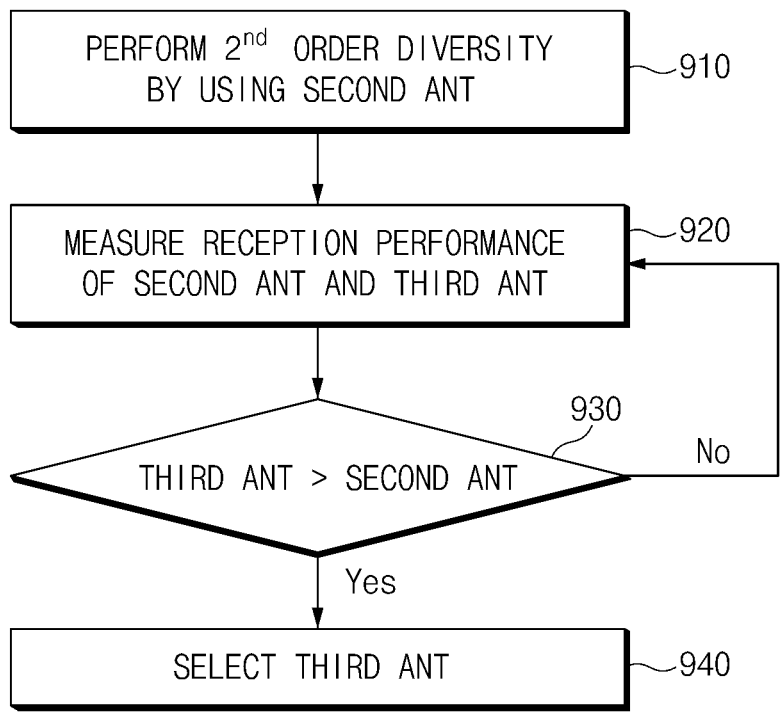
FIG. 9 is a flowchart illustrating a method of an electronic device to determine which one is to be used based on the communication performance of a second antenna and the communication performance of a third antenna according to various embodiments of the present disclosure.

FIG. 9 is a flowchart illustrating a method of the electronic device 500 to determine which one is to be used based on the communication performance of the second antenna 52 and the communication performance of the third antenna 53 according to various embodiments of the present disclosure.

In operation 910, the electronic device 500 may perform communication through 2nd order diversity by using the second antenna 52. The performing of the communication may include data communication, voice communication, and a paging operation based on LTE protocol or 3G protocol.

In operation 920, the electronic device 500 may measure the communication performances of the second antenna 52 and the third antenna 53, for example, RSSI or RSRQ.

In operation 930, the electronic device 500 may determine which one's communication performance is better by comparing the communication performances of the second antenna 52 and the third antenna 53, which are measured in operation 920. Based on the determination result, when the communication performance of the third antenna 53 is better, operation 930 may proceed to operation 940.

However, when the communication performance of the third antenna 53 is not better, the electronic device 500 may maintain operation 910.

In operation 940, the electronic device 500 may perform communication through 2nd order diversity by selecting the third antenna 53.

Figure 10:
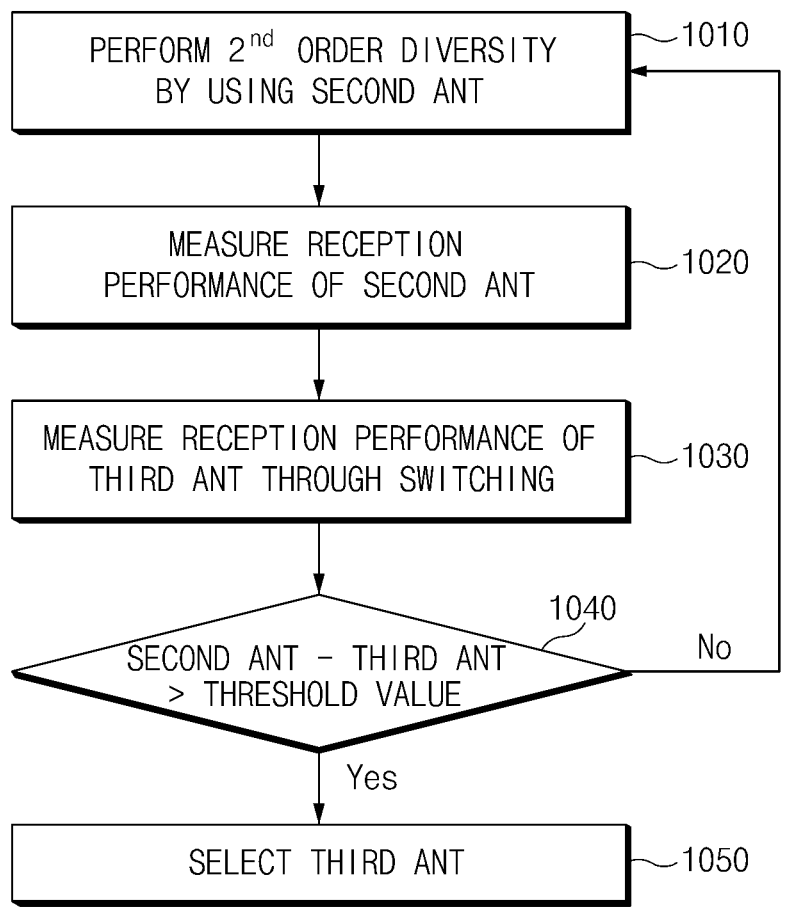
FIG. 10 is a flowchart illustrating a method of an electronic device to determine which one is to be used based on whether a difference between the communication performance of a second antenna and the communication performance of a third antenna is greater than a threshold value according to various embodiments of the present disclosure.

FIG. 10 is a flowchart illustrating a method of the electronic device 500 to determine which one is to be used based on whether a difference between the communication performance of the second antenna 52 and the communication performance of the third antenna 53 is greater than a threshold value according to various embodiments of the present disclosure. The method shown in FIG. 10 may be an operation performed when the first communication circuit 512 or the second communication circuit 514 is selectively connected to a port of a modem.

In operation 1010, the electronic device 500 may perform communication through 2nd order diversity by using the second antenna 52.

In operation 1020, the electronic device 500 may measure the communication performance of RSSI or RSRQ of the second antenna 52.

In operation 1030, the electronic device 500 may measure the communication performance of the third antenna 53 through antenna switching.

In operation 1040, the electronic device 500 may determine whether a difference between the communication performance of the second antenna 52 measured in operation 1020 and the communication performance of the third antenna 53 measured in operation 1030 is greater than a predetermined value. If the difference between the communication performance of the second antenna 52 and the communication performance of the third antenna 53 is not greater than the predetermined value, operation 1040 proceeds to operation 1050.

However, if the difference between the communication performance of the second antenna 52 and the communication performance of the third antenna 53 is greater than the predetermined value, the electronic device 500 may maintain operation 1010.

In operation 1050, the electronic device 500 may perform communication through 2nd order diversity by using the third antenna 53.

According to various embodiments of the present disclosure, a method performed in an electronic device may include: collecting operation information on at least one of a data communication operation, a paging operation, and a voice communication operation of a first antenna, a second antenna, or a third antenna; determining at least one antenna to be used of the first antenna, the second antenna, and third antenna based on at least part of the collected operation information; and performing communication by using the determined antenna.

According to various embodiments of the present disclosure, the method may further include collecting electric field information on a communication electric field state around the electronic device. In this case, he determining of the at least one antenna may be performed further based on at least part of the collected electric field information.

According to various embodiments of the present disclosure, when the collected operation information is information for receiving a paging signal through the third antenna during data communication through the first antenna, the determining of the at least one antenna may include determining to stop the data communication being executed by the first antenna and perform the voice communication.

According to various embodiments of the present disclosure, the method may further include stopping the data communication being executed by the first antenna and changing a resonance of the first antenna through an antenna matching change to perform the voice communication.

According to various embodiments of the present disclosure, the method may further include grounding the third antenna by controlling a switch connected to the third antenna.

According to various embodiments of the present disclosure, when the collected operation information is information for terminating the voice communication, the determining of the at least one antenna may include determining to allow the first antenna to resume the stopped data communication.

According to various embodiments of the present disclosure, when the collected operation information is information for performing the paging operation or the voice communication through the first antenna, the determining of the at least one antenna may include determining at least one antenna to be used of the second antenna and the third antenna based on a communication electric field state.

According to various embodiments of the present disclosure, the determining of the at least one antenna may include when the communication electric field state is greater than a first threshold value, using only the first antenna and when the communication electric field state is less than the first threshold value, using at least one of the second antenna and the third antenna together with the first antenna.

According to various embodiments of the present disclosure, the determining of the at least one antenna may further include selecting one antenna to be used by the electronic device based on communication performances of the second antenna and the third antenna.

According to various embodiments of the present disclosure, the communication performance may be measured by measuring one of a Received Signal Strength Intensity/Indication (RSSI), Reference Signal Received Power (RSRP), and Reference Signal Received Quality (RSRQ).

According to various embodiments of the present disclosure, the determining of the at least one antenna may further include selecting one antenna to be used by the electronic device based on whether a difference between receptions performances of the second antenna and the third antenna is greater than a threshold value.

According to various embodiments of the present disclosure, the determining of the at least one antenna may further include selecting one antenna to be used by the electronic device based on a communication performance when the first antenna is used alone and a communication performance when the first antenna and the third antenna are used together.

According to various embodiments of the present disclosure, the determining of the at least one antenna may further include selecting one antenna to be used by the electronic device based on a communication performance of the first antenna when the second antenna is used and a communication performance of the first antenna when the third antenna is used.

According to various embodiments of the present disclosure, the determining of the at least one antenna may further include selecting one antenna to be used by the electronic device further based on a difference between a communication performance of the second antenna and a communication performance of the third antenna.

According to various embodiments of the present disclosure, an electronic device may include: a communication circuit configured to perform communication with an external electronic device based on a first communication protocol or a second communication protocol; a first antenna, a second antenna, and a third antenna connected to the communication circuit; a processor electrically connected to the communication circuit; and a memory electrically connected to the processor, The processor may collect operation information and electric field state information on at least one of a data communication operation, a paging operation, and a voice communication operation of the communication circuit and allow the communication circuit to perform communication by using at least one of the first antenna, the second antenna, and the third antenna based on at least part of the collected operation information and electric field state information.

The communication circuit may include: a first communication circuit configured to perform communication by using the first antenna or the second antenna; and a second communication circuit configured to perform communication by using the third antenna.

According to various embodiments of the present disclosure, the second communication circuit may perform the paging operation by using the third antenna.

According to various embodiments of the present disclosure, the electronic device may further include a switch configured to selectively connect the communication circuit to the second antenna or the third antenna.

According to various embodiments of the present disclosure, the processor may ground the third antenna through the switch when the third antenna is not in use.

According to various embodiments of the present disclosure, the first communication protocol may include an LTE communication protocol and the second communication protocol may include at least one of 2G, 2.5G, and 3G communication protocols.

A computer readable recording medium, which is executed by at least one processor according to various embodiments of the present disclosure, may include instructions set to collect operation information on at least one of a data communication operation, a paging operation, and a voice communication operation of a first antenna, a second antenna, or a third antenna; and perform, by the electronic device, communication by using at least one of the first antenna, the second antenna, and the third antenna based on at least part of the collected operation information.

According to at least one of the technical solution of the present disclosure described above, the electronic device and the method according to various embodiments of the present disclosure perform communication by using at least one of a first antenna, a second antenna, and a third antenna but uses the third antenna for a paging operation. Thus, as an antenna used for data communication does not perform a paging operation, the stability of the data communication may be improved.

Additionally, the electronic device and the method according to various embodiments of the present disclosure may consider an isolation issue with the first antenna through a method of selecting the second antenna spaced from the first antenna or the third antenna adjacent to the first antenna among the second antenna and the third antenna to be used in addition to the first antenna (for example, a main antenna).

Additionally, in relation to an operation of the first antenna, when the third antenna is not required to be used, the electronic device and the method may improve communication stability by grounding the third antenna.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 140, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method performed in an electronic device, the method comprising:
    collecting operation information on at least one of a data communication operation, a paging operation, and a voice communication operation of a first antenna, a second antenna, or a third antenna;
    determining at least one antenna to be used of the first antenna, the second antenna, and third antenna based on at least part on the collected operation information; and communicating with the determined antenna,
    wherein, when the collected operation information is information for performing the paging operation or the voice communication through the first antenna, the determining of the at least one antenna further comprises determining at least one of the second antenna and the third antenna based on a communication electric field state.

2. The method of claim 1, further comprising collecting electric field information on a communication electric field state around the electronic device, and wherein the determining of the at least one antenna is performed is further based on at least part on the collected electric field information.

3. The method of claim 1, wherein when the collected operation information is information for receiving a paging signal through the third antenna during data communication through the first antenna, and wherein the determining of the at least one antenna further comprises determining to stop the data communication being executed by the first antenna and to perform the voice communication.

4. The method of claim 3, further comprising stopping the data communication being executed by the first antenna and changing a resonance of the first antenna through an antenna matching change to perform the voice communication.

5. The method of claim 3, wherein when the collected operation information is information for terminating the voice communication, the determining of the at least one antenna comprises determining to allow the first antenna to resume the stopped data communication.

6. The method of claim 1, wherein the determining of the at least one antenna comprises when the communication electric field state is greater than a first threshold value, using only the first antenna and when the communication electric field state is less than the first threshold value, using at least one of the second antenna and the third antenna together with the first antenna.

7. The method of claim 1, wherein the determining of the at least one antenna further comprises selecting one antenna to be used by the electronic device based on communication performances of the second antenna and the third antenna.

8. The method of claim 7, wherein the communication performance is measured by measuring one of a Received Signal Strength Intensity/Indication (RSSI), Reference Signal Received Power (RSRP), and Reference Signal Received Quality (RSRQ).

9. The method of claim 1, wherein the determining of the at least one antenna further comprises selecting one antenna to be used by the electronic device based on whether a difference between receptions performances of the second antenna and the third antenna is greater than a threshold value.

10. The method of claim 1, wherein the determining of the at least one antenna further comprises selecting one antenna to be used by the electronic device based on a communication performance when the first antenna is used alone and a communication performance when the first antenna and the third antenna are used together.

11. The method of claim 1, wherein the determining of the at least one antenna further comprises selecting one antenna to be used by the electronic device based on a communication performance of the first antenna when the second antenna is used and a communication performance of the first antenna when the third antenna is used.

12. The method of claim 11, wherein the determining of the at least one antenna further comprises selecting one antenna to be used by the electronic device further based on a difference between a communication performance of the second antenna and a communication performance of the third antenna.

13. An electronic device comprising:
   a communication circuit configured to perform communication with an external electronic device based on a first communication protocol or a second communication protocol;
   a first antenna, a second antenna, and a third antenna connected to the communication circuit;
   a processor electrically connected to the communication circuit; and
   a memory electrically connected to the processor,
   wherein the processor collects operation information and electric field state information on at least one of a data communication operation, a paging operation, and a voice communication operation of the communication circuit and allows the communication circuit to perform communication by using at least one of the first antenna, the second antenna, and the third antenna based on at least part of the collected operation information and electric field state information, and
   wherein, when the collected operation information is information for performing the paging operation or the voice communication through the first antenna, the processor is configured to determine selection of at least one of the second antenna and the third antenna based on a communication electric field state.

14. The electronic device of claim 13, wherein the communication circuit comprises:
   a first communication circuit configured to perform communication by using the first antenna or the second antenna; and
   a second communication circuit configured to perform communication by using the third antenna.

15. The electronic device of claim 14, wherein the second communication circuit performs the paging operation by using the third antenna.

16. The electronic device of claim 13, further comprising a switch configured to selectively connect the communication circuit to the second antenna or the third antenna.

17. The electronic device of claim 16, wherein the processor grounds the third antenna through the switch when the third antenna is not in use.

18. The electronic device of claim 13, wherein the first communication protocol comprises an LTE communication protocol and the second communication protocol comprises at least one of 2G, 2.5G, and 3G communication protocols.

19. A non-transitory computer readable recording medium configured to store instructions executed by at least one processor and readable by a computer,
   wherein the instructions are set to collect operation information on at least one of a data communication operation, a paging operation, and a voice communication operation of a first antenna, a second antenna, or a third antenna; and allow an electronic device to perform communication by using at least one of the first antenna, the second antenna, and the third antenna based on at least part of the collected operation information.

* * * * *